Patented Nov. 30, 1943

2,335,259

UNITED STATES PATENT OFFICE 2,335,259

PROCESS FOR THE PRODUCTION OF ACID HALIDES

William S. Calcott, Woodstown, N. J., assignor to E. I. du Pont de Nemours & Company, Wilmington, Del., a corporation of Delaware No Drawing. Application May 21, 1940, Serial No. 336,435

2 Claims. (Cl. 204—163)

This invention relates to new processes of forming sulfonic acid chlorides and bromides. More particularly it relates to the reaction of sulfuryl chloride or bromide and a catalyst or mixture of sulfur dioxide and chlorine or bromine; with organic compounds containing at least one and preferably at least three unsubstituted methylene groups under the influence of radiation from a low temperature vapor lamp maintained in close proximity to the reaction zone.

This invention in one important aspect relates to the reaction of hydrocarbon compounds with sulfur dioxide and a halogen, especially chlorine and bromine to introduce sulfonyl halide groups while subjecting the reactants to irradiation by the use of a low temperature vapor lamp maintained in close proximity to the reaction zone. More particularly, it relates to the production of hydrocarbon sulfonyl chlorides by reacting a saturated hydrocarbon with sulfur dioxide and chlorine while subjecting the reactants to irradiation by means of a low temperature vapor lamp which is immersed in the reaction fluids.

In general, the objects of the invention are to improve the production of sulfonyl halides from (a) admixed sulfur dioxide and chlorine or bromine, (b) sulfuryl chlorides or bromides, from organic compounds containing an aliphatically saturated portion. A further object is to irradiate the above reactions with actinic light so that side reactions are eliminated.

This invention has for a further object an improved procedural method for subjecting to actinic light sulfur dioxide, chlorine or bromine, and hydrocarbon reactants used for the production of sulfonyl halides. A further object is to irradiate a reactant mixture of a hydrocarbon compound, sulfur dioxide and chlorine in such a manner that the actinic light is more effectively used and an improved reaction efficiency obtained. A still further object is to improve the above-described process so that halogenation and particularly chlorination is inhibited. Another object is to obtain improved products from the interaction of sulfur dioxide, chlorine and hydrocarbon compounds containing a saturated hydrocarbon radical of at least 5 carbon atoms. Still other objects will appear hereinafter.

The above objects are accomplished by the herein described invention which in its broader aspects comprises reacting an organic compound containing at least one unsubstituted methylene (—$CH_2$) group with (a) admixed sulfur dioxide and chlorine or bromine, (b) sulfuryl chloride or bromide and a catalyst, while irradiating the reaction zone from a light source comprising a low temperature vapor lamp. The sulfonyl halides may be recovered as such or further reacted to form derivatives.

The reaction of organic compounds containing a trimethylene radical with sulfuryl chloride, and an organic catalyst, especially an organic amine is more fully described in Kharasch application, Serial No. 291,515, filed August 23, 1939, and it is to be understood that each of the reactions and examples thereof may be conducted under irradiation from a low temperature vapor lamp as herein disclosed.

In a preferred embodiment of the invention, the objects are accomplished by reacting a nongaseous hydrocarbon containing a saturated nucleus of at least three carbon atoms in the liquid state with sulfur dioxide and chlorine while irradiating the reacting fluids with a low temperature mercury vapor lamp which is immersed in the reacting fluids either directly or enveloped in a shield which is transparent to the light from said lamp.

A hydrocarbon containing at least one methylene group which may be attached to an acyclic, alicyclic or isocyclic carbon atom and preferably a saturated aliphatic or alicyclic hydrocarbon or mixture of such hydrocarbons is treated with admixed sulfur dioxide and chlorine in a vessel which contains a low temperature vapor lamp, preferably a low temperature mercury vapor lamp. The lamp is maintained in the reaction zone in such a manner that it is partially or completely immersed in the hydrocarbon. The radiation from the lamp catalyzes the reaction of the sulfur dioxide and chlorine on the hydrocarbon to form a sulfonyl chloride of the hydrocarbon. The sulfonyl chlorides may be hydrolyzed to form true sulfonic acids or salts.

It has been found that a low temperature vapor lamp and especially low temperature mercury vapor lamp, allows the reaction to proceed at a rapid and controllable rate but at the same time reduces side reactions, in particular, chlorination. It is thus possible to produce products which are sulfonyl chloride derivatives largely free from chlorine attached to carbon.

While mercury vapor and rare gas lamps have been previously proposed to activate the reaction between organic compounds and the above reactants to produce sulfonyl halides and particularly between sulfur dioxide and chlorine to produce sulfonyl chloride derivatives, it is believed that the use of the low temperature type is novel and definitely is of considerable utility. The use of low temperature mercury vapor fluorescent lamps in particular constitutes an advance in the art over the high temperature types of mercury vapor and low and high temperature rare gas lamps. The low temperature mercury vapor fluorescent lamps which are used in accordance with the preferred embodiment of the invention are designed to give very little visible light directly from the mercury arc, and they emit as much energy as possible in the ultraviolet region, specifically at 2537 Å. The emitted ultraviolet radiation causes fluorescence in a chemical powder which is deposited on the walls of the tube, thus transforming the invisible ultraviolet radiation into visible radiation. Some of the common phosphors (fluorescent chemicals) which may be used are listed in the table below, together with the color of the emitted light and peak of the radiation.

| Phosphor | General color | Emitted range Å. | Emitted peak Å. |
|---|---|---|---|
| Calcium tungstate | Blue | 3,800–7,000 | 4,400 |
| Magnesium tungstate | Blue-white | 3,800–7,200 | 4,800 |
| Zinc silicate | Green | 4,500–6,200 | 5,250 |
| Zinc beryllium silicate | Yellow-white | 4,500–7,200 | 5,950 |
| Cadmium silicate | Yellow-pink | 4,300–7,200 | 5,950 |
| Cadmium borate | Pink | 4,000–7,200 | 6,150 |

In addition to the phosphors, activators such as manganese may be added. Instead of the single phosphors mentioned above which emit the greater part of their radiation in a relatively narrow band, mixtures may be used to obtain wider bands of radiation. Whereas, for example, one fluorescent lamp may emit the majority of its radiation between about 4000 and 5800 Å., another may be largely between 4800 and 5800 Å. Still another may emit radiation from 3800 to 7400 or 7600 Å, with a sustained peak or plateau of radiation from 4400 to 6200 Å. Thus it is readily apparent that the low temperature mercury vapor lamps may be made to emit any desired range of radiation.

The invention is to be illustrated but not limited by the following examples.

*Example I*

Into a reaction vessel which is made impervious to natural light is charged 500 parts by weight of a paraffin base mineral oil free from olefinic and unsaturated constituents having a distillation range of 270–310° C., a specific gravity at 15.5° C. of 0.803, a refractive index at 20° C. of 1.444 and a Saybolt Universal viscosity at 100° F. of 38 seconds. The reaction vessel is provided with cooling means. A low temperature neon vapor lamp in the form of small spiral is introduced through the large neck of the flask and immersed to the extent of about 50% of its length in the hydrocarbon. The lamp operates on a 2000 volt transformer and has an operating temperature below 50° C. A gaseous mixture of 242 parts by weight of sulfur dioxide and 152 parts by weight of chlorine is passed through the hydrocarbon during a period of one and one-half hours. The reaction mass gains 128 parts by weight. The temperature of the reaction mass is maintained at approximately 20° C. during the reaction.

*Example II*

Into a nickel vessel equipped with an agitator and a glass tube extending from the top nearly to the bottom of the vessel, the glass tube being closed at the lower end and open at the upper end, are charged 110 parts by weight of the oil specified in Example I. The oil filled the vessel about half full. Into the glass tube is placed a mercury vapor Cooper-Hewitt fluorescent lamp, having a fluorescent coating composed of magnesium tungstate as the phosphor on the bulb which converts the ultraviolet light into light of visible wave lengths. The lamp emits light from 3800 to 7200 Å., the majority of the radiation emitted by the lamp falling between the limits of 4000 Å. and 5000 Å., with a peak at 4800 Å. The lamp is fifty inches long, one inch in diameter and of 100 watts power and has an operating temperature below 60° C. The upper end of the lamp protrudes outside the glass tube. A gaseous mixture of 30 parts by weight by sulfur dioxide and 23 parts by weight of chlorine are passed into the hydrocarbon during the course of one hour. The temperature of the reaction mass is maintained under 32° C. by cooling. The sulfonyl chloride formed in this reaction is then hydrolyzed by pouring into 75 parts by weight of 30% sodium hydroxide solution at 75–100° C. The sodium salt of the corresponding hydrocarbon sulfonic acid is thus formed.

*Example III*

The process of Example II is repeated using a 350 watt Cooper-Hewitt mercury vapor lamp of the same dimensions instead of the fluorescent lamp of Example II. The temperature within the lamp envelope remains below 110° C. One hundred and ten parts of the oil used in Example I is treated with 34 parts of sulfur dioxide and 23.5 parts of chlorine over a period of 65 minutes. The resulting hydrocarbon sulfonyl chloride mixture is hydrolyzed in 75 parts of 30% sodium hydroxide to form the sodium alkyl sulfonate.

*Example IV*

Forty-two parts of cyclohexane and 33.8 parts of sulfuryl chloride are introduced into a container which is illuminated by a light source of the type set forth in Example II. 0.2 part of mercapto-thiazoline is added and the reaction mixture is heated to a gentle reflux until no more gas is evolved. The reaction mass is filtered and excess cyclohexane removed by distillation at reduced pressure. After removal of the excess cyclohexane, the residue consists of a mixture of cyclohexyl chloride and cyclohexyl sulfonyl chloride and chlor cyclohexyl sulfonyl chloride.

*Example V*

In a manner similar to that described in Example IV normal heptane is reacted with sulfuryl chloride for one hour at 60–70° C. in the presence of quinoline.

*Example VI*

Two hundred and twenty parts of cetane and 226 parts of benzene are mixed and heated to 60° C. in the presence of actinic light from a light source of the type set forth in Example II. One part of pyridine is added to the mixture and 135 parts of sulfuryl chloride are added slowly over a period of 4 hours, maintaining the temperature at 60° C. There is a constant evolution of HCl gas during this time. After this evolution ceases, the benzene is distilled under reduced pressure, and the crude cetane sulphonyl chloride hydrolyzed with 30% aqueous caustic soda solution at reflux temperature. The cetane sulfonic acid thus produced contains an average of .117 chlorine atoms per molecule.

Example VII

Two hundred and twenty-five parts of a saturated white mineral oil having a specific gravity of 0.805, a boiling range of 284–335° C., a refractive index of 1.447 and a Saybolt viscosity of 40 at 100° F. is mixed with 225 parts of benzene and warmed to 70° C. in the presence of light from a light source of the type set forth in Example II. One part of pyridine is added to the mixture and then 135 parts of sulfuryl chloride are introduced over a period of 4 hours. There is a steady evolution of gas throughout the entire reaction. When this evolution has ceased, the benzene, excess sulfuryl chloride and dissolved gases are distilled under reduced pressure. The crude aliphatic sulfonyl chloride is hydrolyzed with 30% aqueous caustic soda solution at the reflux temperature. The sulfonic acid thus produced shows surface activity in water solution.

Similar results are obtained by substituting mercapto-thiazoline for the pyridine.

The invention is not to be limited to the specific low temperature vapor lamps set forth in the above examples. A useful lamp which may be substituted therefor is the high pressure capillary quartz type of mercury lamp. This lamp contains mercury vapor in a small capillary chamber. The chamber is about 1½ inches long and has an outside diameter of about ¼ inch and a ¹⁄₁₂ inch bore. Such lamps operate under a pressure in the neighborhood of 1000 to 1500 lbs. per square inch. They are provided with a water jacket through which water is circulated. This jacket provides a means for absorbing approximately 90 per cent of the infra red rays. In the case of a 1000 watt lamp the majority of the radiations lie above 4000 Angstrom units.

The invention is not limited to the above conditions which are for the most part batchwise. On the contrary, it may be carried out continuously by passing a gaseous mixture of the reactants, e. g. sulfur dioxide and chlorine countercurrent to or concurrent with a stream of hydrocarbons as disclosed in Lockwood and Richmond, U. S. Patent No. 2,193,824. When carrying out the process in the manners therein described the time of contact of the mixed gases and hydrocarbons may be shortened by some such means as increasing the rate of flow of the hydrocarbons.

The sulfonylation reaction may be carried out using a wide range of proportions of reactants. The sulfur dioxide may be less than the amount of chlorine but for the most purposes from the standpoint of good wetting, sudsing and deterging properties is preferably in excess. A ratio of about 1.0 to 20 mols of sulfur dioxide per mol of chlorine represents a practical range and a range of 1.25 to 4 mols of sulfur dioxide to 1 mol of chlorine a preferred range. A ratio of 2.5 to 3.5 of sulfur dioxide to 1 mol of chlorine represents a range whereby very good results are obtained.

As will be apparent from the above, it is not necessary that the sulfur dioxide and chlorine be in the vapor phase; on the contrary, one or both of these reactants may be wholly or partly in the liquid phase.

The reaction may take place over a wide temperature range, e. g. from −40° C. and below to the decomposition point of the formed halides. It is preferably carried out at temperatures from −20° C. to +80° C. and preferably from −20° C. to +20° C.

The duration of the reaction may vary widely and depends largely on the reactivity of the constituents. Usually less than four hours is sufficient but in some cases, sixteen or more hours will be required. It is advisable to continue the reaction until less than 60% of the hydrocarbon material has reacted. The resulting mixture is then removed, hydrolyzed, e. g. with a hot alkali solution whereby the sulfonyl chlorides present are hydrolyzed to the corresponding sulfonates. The unreacted hydrocarbon is then separated by diluting the hydrolyzed mass with an aqueous solution, whereby it separates as a top layer. This layer is thereupon recovered and subjected to a further reaction. It may be admixed with fresh hydrocarbons. For good detergents as set forth in Henke and Lockwood, Serial No. 295,695, filed September 19, 1939, it is desirable to continue the reaction until from 10 to 50% and preferably 10 to 30% of the hydrocarbon material has reacted.

The low temperature vapor lamps used in accordance with the teachings of this invention are characterized in that they emit a substantial proportion of light between 3800 and 7600 Å. and have an operating temperature below 150° C. and preferably below 75° C. The nature of the vapor present in the lamp may vary quite widely. Thus, rare gases such as neon, argon, krypton, xenon, and helium may be used. Suitable metallic vapors may include mercury, zinc, cadmium and sodium. Other vapors, e. g. carbon dioxide, etc. may be used. The preferred lamps as above stated are, however, low temperature mercury vapor lamps in which the ultra violet radiations are converted into light of visible wave lengths.

The lamps may be constructed so as to be immersed in the reaction zone by bending the transparent tubing so that electrical connections are outside or by shielding the electrical connections from the reaction mass with materials impervious thereto, such as nickel, synthetic plastics, glass, etc. The lamp may be protected by surrounding it with a sleeve or envelope pervious to the emitted light, e. g. a glass or quartz tube. The container may be made of glass or a material which transmits all the radiation emitted by the lamp or a portion of the wave lengths.

The invention is, of course, not limited to the treatment of refined mineral oil fractions as set forth in the above examples. On the contrary, hydrocarbons in general which contain an unsubstituted methylene —$CH_2$— group may be used. Thus, the alkanes including straight and branched chain and iso alkanes may be used. Suitable hydrocarbons of this type are methane, ethane, propane, n-butane, isobutane, n-pentane, isopentane, hexanes, octanes, nonanes, decanes, octadecanes, cetane, etc. The non-gaseous alkanes and particularly those of 12 to 18 carbon atoms are preferred, especially if detergents are desired. Hydrocarbon waxes, including hard and soft paraffin wax, match wax, scale wax, wax distillates, micro crystalline paraffin wax, etc. may be used.

Another class of useful hydrocarbons are the cycloaliphatics of which cyclopentane, cyclohexane, ethyl cyclohexane, dodecylcyclohexane, menthane, camphane, pinane, and the naphthenes having from 12 to 20 carbon atoms derived from catalytic reduction of naphthenic acids are illustrative.

Still another broad class of compounds which may be used are the alkylated aromatic hydrocarbons. The alkyl groups may be primary or secondary or iso. Suitable compounds of this type are propylbenzene, isopropylbenzene, octylbenzene, decylbenzene, hexadecylbenzene, octylnaphthalene, decylnaphthalene, dodecylnaphthalene, etc. Mixtures of alkylated compounds such as might be obtained by condensing chlorinated kerosene, petroleum, white oils, etc., with aromatic hydrocarbons, such as benzene, xylene, methyl naphthalene, etc., by a condensation reaction such as the Friedel-Crafts reaction are also very satisfactory. It is to be understood that the compounds of the type just discussed are not to be limited to the monoalkylated compounds as those containing two, three, four and more alkyl groups having utility. Suitable compounds of the last-mentioned type include dibutylbenzene, triamyl benzene, tri-isopropylbenzene, tetra-amylbenzene, dioctylbenzene, didodecylnaphthalene, etc.

As stated above, the invention is not to be limited to the treatment of single hydrocarbons, but mixtures of any of the above may be used. Nor is it limited to hydrocarbons only. On the contrary it may be practiced with many organic compounds or mixtures of compounds containing a saturated aliphatic or cycloaliphatic hydrocarbon radical group of at least 12 carbon atoms are useful. While certain functional groups might cause side reactions the main acyl or sulfonyl halidation reaction still takes place. As examples of representative other types of compounds, mention is made of halogenated saturated hydrocarbons, e. g. doodecylbromide, cetyl chloride, chlorinated kerosene, cetene, alcohols, e. g. dodecyl and cetyl alcohols, aldehydes, such as heptaldehyde, lauric aldehyde, ketones, e. g. pentadecanone-8, heptadecanone-8, esters such as methyl stearate, and ethyl palmitate, glycerides such as lard, palm oil, coconut oil, etc., acylated amines, N-dodecyl acetamide, N-cetyl propionamide; and saturated heterocyclic compounds, e. g. N-ethyl piperidine, N-acetyl piperidine and decahydro-N-ethyl carbazole.

As will be apparent from the above, an important feature of the invention resides in utilizing the higher wave lengths of light from a vapor lamp such as within the range from 3800 A. to 7600 A. It is surprising that these higher wave lengths of light are effective in producing compounds possessing superior deterging properties in view of the known energetic action of lower wave lengths of light, e. g. ultraviolet light in other reactions.

The invention hereof has a number of distinct advantages over the prior art. When an opaque vessel is used in carrying out the reaction, the light has previously been introduced through a transparent window in the side of the vessel or by reflecting the radiation into a tube extending into the vessel. In either case there is a considerable loss of light inherent in such methods of introduction. By means of the present invention the light may be much more efficiently utilized since the reaction mass surrounds it. The ordinary tungsten and high temperature mercury vapor lamps are not susceptible to placement within the reaction vessel because of their high temperature which besides tending to decompose the products of the reaction creates a fire hazard in the presence of the hydrocarbons.

Since the reaction appears to require a definite amount of light per unit of reacting mass, the quantities which can be reacted are limited when light has to be introduced from the outside of the vessel due to structural contingencies. However, when it is possible to bring the light source inside the vessel, the size of the vessel, the quantities of reacting materials, and the number of light sources may be increased to effect desired economies of operation.

If operations on a large scale are attempted with insufficient quantities of light present, an excessive amount of sulfur dioxide and chlorine, for example, is required to produce a given quantity of hydrocarbon sulfonyl chloride. At the same time undesirable chlorination takes place. For instance, when the process of Example II is carried out by placing an incandescent tungsten lamp of 1000 watts above the glass tube extending into the kettle and reflecting the light into the reaction mass by means of a white cone at the bottom of the tube, 45 lbs. of sulfur dioxide, 35 lbs. of chlorine, and a reaction time of 1½ hours are required for producing the same amount of hydrocarbon sulfonyl chloride produced with the 30 lbs. of sulfur dioxide, 23 lbs. of chlorine, and 1 hour reaction time of the example.

As many apparently widely different embodiments of the invention may be made without departing from the spirit and scope thereof, it is to be understood that I do not limit myself to the specific embodiments herein except as defined by the appended claims.

I claim:
1. The process of producing hydrocarbon sulfonyl chlorides which comprises reacting a saturated aliphatic hydrocarbon of at least 8 carbon atoms with a mixture of sulfur dioxide and chlorine containing at least one mol of sulfur dioxide per mol of chlorine at a temperature from —40° C. to +80° C. while irradiating the reaction zone with radiations from a low temperature fluorescent mercury lamp submerged in the reacting fluids, the greater part of the radiations emitted from the lamp falling within the limits of 3800 A. and 7600 A.

2. The process of producing hydrocarbon sulfonyl chlorides which comprises reacting a paraffin base mineral oil free from olefinic and unsaturated constituents with a mixture of sulfur dioxide and chlorine containing at least one mol of sulfur dioxide per mol of chlorine at a temperature from —40° C. to +80° C. while irradiating the reaction zone with radiations from a low temperature fluorescent mercury vapor lamp submerged in the reacting fluids, said lamp emitting light from 3800 to 7200 A. units with the majority of the radiations falling within the limits of 4000 A. units and 5800 A. units.

WILLIAM S. CALCOTT.

CERTIFICATE OF CORRECTION.

Patent No. 2,335,259.    November 30, 1943.

WILLIAM S. CALCOTT.

It is hereby certified that error appears in the printed specification of the above numbered patent requiring correction as follows: Page 2, second column, line 11, for "5000 A." read --5800 A.--; page 4, first column, line 33, for "doodecylbromide" read --dodecylbromide--; and that the said Letters Patent should be read with this correction therein that the same may conform to the record of the case in the Patent Office.

Signed and sealed this 29th day of February, A. D. 1944.

Leslie Frazer (Seal)    Acting Commissioner of Patents.

CERTIFICATE OF CORRECTION.

Patent No. 2,335,259.   November 30, 1943.

WILLIAM S. CALCOTT.

It is hereby certified that error appears in the printed specification of the above numbered patent requiring correction as follows: Page 2, second column, line 11, for "5000 A." read --5800 A.--; page 4, first column, line 33, for "doodecylbromide" read --dodecylbromide--; and that the said Letters Patent should be read with this correction therein that the same may conform to the record of the case in the Patent Office.

Signed and sealed this 29th day of February, A. D. 1944.

Leslie Frazer (Seal)   Acting Commissioner of Patents.